United States Patent
Mahaffey

(10) Patent No.: US 10,241,763 B2
(45) Date of Patent: Mar. 26, 2019

(54) INTER-PROCEDURAL TYPE PROPAGATION FOR DEVIRTUALIZATION

(71) Applicant: Microsoft Technology Licensing, LLC, Redmond, WA (US)

(72) Inventor: Terry Jack Mahaffey, Redmond, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 0 days.

(21) Appl. No.: 14/565,590

(22) Filed: Dec. 10, 2014

(65) Prior Publication Data
US 2016/0170724 A1 Jun. 16, 2016

(51) Int. Cl.
*G06F 8/30* (2018.01)
*G06F 8/41* (2018.01)
*G06F 9/45* (2006.01)

(52) U.S. Cl.
CPC ............... *G06F 8/43* (2013.01); *G06F 8/315* (2013.01); *G06F 8/437* (2013.01); *G06F 8/4441* (2013.01)

(58) Field of Classification Search
None
See application file for complete search history.

(56) References Cited

U.S. PATENT DOCUMENTS

| | | | | |
|---|---|---|---|---|
| 6,041,179 A * | 3/2000 | Bacon | ................... | G06F 8/4434 712/E9.085 |
| 6,173,444 B1 * | 1/2001 | Archambault | .......... | G06F 8/434 717/145 |
| 6,526,571 B1 * | 2/2003 | Aizikowitz | ........... | G06F 9/4431 712/E9.085 |
| 6,546,551 B1 | 4/2003 | Sweeney et al. | | |
| 6,865,730 B1 * | 3/2005 | Burke | ................... | G06F 9/4491 717/116 |
| 7,472,382 B2 * | 12/2008 | Archambault | .......... | G06F 8/443 717/144 |
| 7,493,610 B1 | 2/2009 | Onodera et al. | | |
| 7,716,657 B2 | 5/2010 | Inglis et al. | | |
| 7,793,277 B2 | 9/2010 | Schmidt | | |

(Continued)

OTHER PUBLICATIONS

Ishizaki, Kazuaki, et al. "A Study of Devirtualization Techniques for a Java™ Just-In-Time Compiler." (2000). <http://cs.ucsb.edu/~ckrintz/papers/devirt-ibmjit.pdf>.*

(Continued)

*Primary Examiner* — Wei Y Zhen
*Assistant Examiner* — Binh K Luu

(57) ABSTRACT

Intra-procedural and inter-procedural dynamic type propagation can be used to optimize code by devirtualizing virtual functions. In the intra-procedural pass each function in the program is inspected. If the dynamic type of a variable within the function is determined, the static type is replaced by the dynamic type. If the dynamic type of a variable within the function is not determinable, a placeholder type is inserted. After each function and each statement in the function and each statement outside of the function is examined, an attempt is made to resolve all of the placeholder types references created in the first pass, replacing the placeholder type with the dynamic type. This process is iterated until additional dynamic type determination ends.

14 Claims, 6 Drawing Sheets

(56) References Cited

U.S. PATENT DOCUMENTS

| | | | | |
|---|---|---|---|---|
| 8,572,594 | B2* | 10/2013 | Sathyanathan | G06F 9/46 717/114 |
| 8,578,352 | B1 | 11/2013 | Mitrovic et al. | |
| 2003/0051169 | A1 | 3/2003 | Sprigg et al. | |
| 2005/0060691 | A1* | 3/2005 | Das | G06F 8/433 717/132 |
| 2006/0200809 | A1* | 9/2006 | Grcevski | G06F 8/443 717/140 |
| 2007/0038988 | A1 | 2/2007 | Das | |
| 2007/0240137 | A1* | 10/2007 | Archambault | G06F 8/4442 717/140 |
| 2008/0201688 | A1* | 8/2008 | Centonze | G06F 8/75 717/104 |
| 2008/0201693 | A1* | 8/2008 | Centonze | G06F 9/468 717/118 |
| 2010/0198799 | A1* | 8/2010 | Krishnan | G06F 11/3696 707/702 |
| 2012/0084761 | A1* | 4/2012 | Maeda | G06F 8/20 717/132 |
| 2013/0204924 | A1* | 8/2013 | Nair | G06F 9/45545 709/203 |
| 2014/0380290 | A1* | 12/2014 | Auerbach | G06F 8/443 717/156 |
| 2015/0370560 | A1* | 12/2015 | Tan | G06F 9/30058 717/148 |

OTHER PUBLICATIONS

Plevyak, John, and Andrew A. Chien. "Automatic Interprocedural Optimization for Object-Oriented Languages." Penn State University. N. p., Feb. 29, 1996. Web. Mar. 30, 2016. <http://citeseerx.ist.psu.edu/viewdoc/download?doi=10.1.1.54.4449&rep=rep1&type=pdf>.*

Murray, Derek G. "Steno: Automatic Optimization of Declarative Queries." ACM SIGPLAN Notices, vol. 46, No. 6, Jun. 2011, pp. 121-131.*

Mircea Namolaru, "Devirtualization in GCC", In Proceedings of the GCC developers' Summit, Jun. 28, 2006, 12 pages.

Sonajalg, Sander, "Program Analysis Techniques for Method Call Devirtualization in Object-Oriented Languages", Published on: Dec. 7, 2009, Available at: http://www.cs.ut.ee/~varmo/seminar/sem09S/final/s6najalg.pdf.

Diwan, Amer, "Simple and Effective Analysis of Statically-Typed Object Oriented Programs", In Proceedings of the 11th ACM SIGPLAN conference on Object-oriented programming, systems, languages, and applications, Oct. 1, 1996, 14 pages.

Kumar, Rajeev, "Precise Static Type Analysis for Object Oriented Programs", In Newsletter ACM SIGPLAN Notices, vol. 42, Issue 2, Feb. 1, 2007, 10 pages.

Bhat, Sajad, "De-virtualizing virtual Function Calls using various Type Analysis Techniques in Object-Oriented Programming Languages", In Journal of Computer Engineering, vol. 5, Issue 4, Sep. 2012, 9 pages.

Glek, Taras, "Optimizing real-world applications with GCC Link Time Optimization", In Proceedings of the GCC Developers Summit, Oct. 25, 2010, 21 pages.

Oates, Carolyn, "Type Analysis in a Java Virtual Machine", Retrieved on: Oct. 7, 2014, Available at: http://web.student.tuwien.ac.at/~e9327577/DApres111808.pdf.

Bacon, et al., "Fast Static Analysis of C++ Virtual Function Calls", In Proceedings of the 11th Conference on Object-Oriented Programming, Systems, Languages, and Applications, Oct. 1, 1996, 19 Pages.

"International Search Report & Written Opinion Issued in PCT Application No. PCT/US2015/064161", dated Mar. 14, 2016, 11 Pages.

Sundaresan, et al., "Practical Virtual Method Call Resolution for Java", In Proceedings of the 15th Conference on Object-Oriented Programming, Systems, Languages, and Applications, Oct. 1, 2000, 17 Pages.

"Second Written Opinion Issued in PCT Application No. PCT/US2015/064161", dated Oct. 10, 2016, 7 Pages.

"International Preliminary Report on Patentability Issued in PCT Application No. PCT/US2015/064161", dated Jan. 24, 2017, 8 Pages.

* cited by examiner

INTER-PROCEDURAL TYPE PROPAGATION FOR DEVIRTUALIZATION

BACKGROUND

Devirtualization refers to the compiler optimization in object oriented language compilers in which dynamically bound function calls are converted into statically bound direct calls. Performance improvements can be realized in part because the overhead accompanying dynamic dispatch is avoided. Dynamic dispatch refers to the processing that is necessary to convert a call to a virtual function to a call to a derived class that actually implements the virtual function. Performance improvements can also be realized because there can be additional opportunities for inlining of function calls. Inlining refers to replacing a call to a function in source code with the actual code of the called function in the compiled code.

SUMMARY

Type information determined during compilation can be used to eliminate runtime type checks for a program. Type information for each statement in a program can be determined by examining each statement in the program in a first intra-procedural pass and inserting placeholder types for variables whose type is unknown and, in a second inter-procedural pass, resolving the inserted placeholder types by propagating variable types from function to function.

Type information derived as described above can be used for devirtualization. Type propagation for devirtualization as described herein is a whole program optimization in which the set of possible dynamic types of a variable referenced by a call to a virtual function are identified by a two pass process. In a first intra-procedural pass, each function is inspected. An attempt is made to determine the dynamic type of each variable referenced in the function. If the function calls a function that is not a virtual function, the type of each variable in the called function can be determined. If the function calls a virtual function, the dynamic type of each variable in the virtual function is inspected. It may not be possible to determine the dynamic type of each variable in the virtual function because types can come from parameters or return values of other functions and so on. In this case type placeholders may be created in the first pass for those variables whose types cannot be determined.

In a second inter-procedural pass an attempt is made to resolve the undetermined types from the first pass by identifying all the callers of a particular virtual function and determining what types the callers pass in to the virtual function. Similarly, the return types, the types that are returned from a virtual function to a calling function can be determined. In the second inter-procedural pass an attempt is made to resolve the undetermined types from the first pass by inspecting all callees of a particular virtual function and what types the called function passes in to the calling virtual function. The placeholder types can be updated with the type information discovered during the second inter-procedural pass. Type information of any other (caller or callee) functions affected by the refined type information can be updated. This process can be iterated until no new type information can be determined. Using the refined type information, devirtualization can be performed. While presented within the context of C++ the concepts described herein apply to any language in which there are type-based virtual functions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
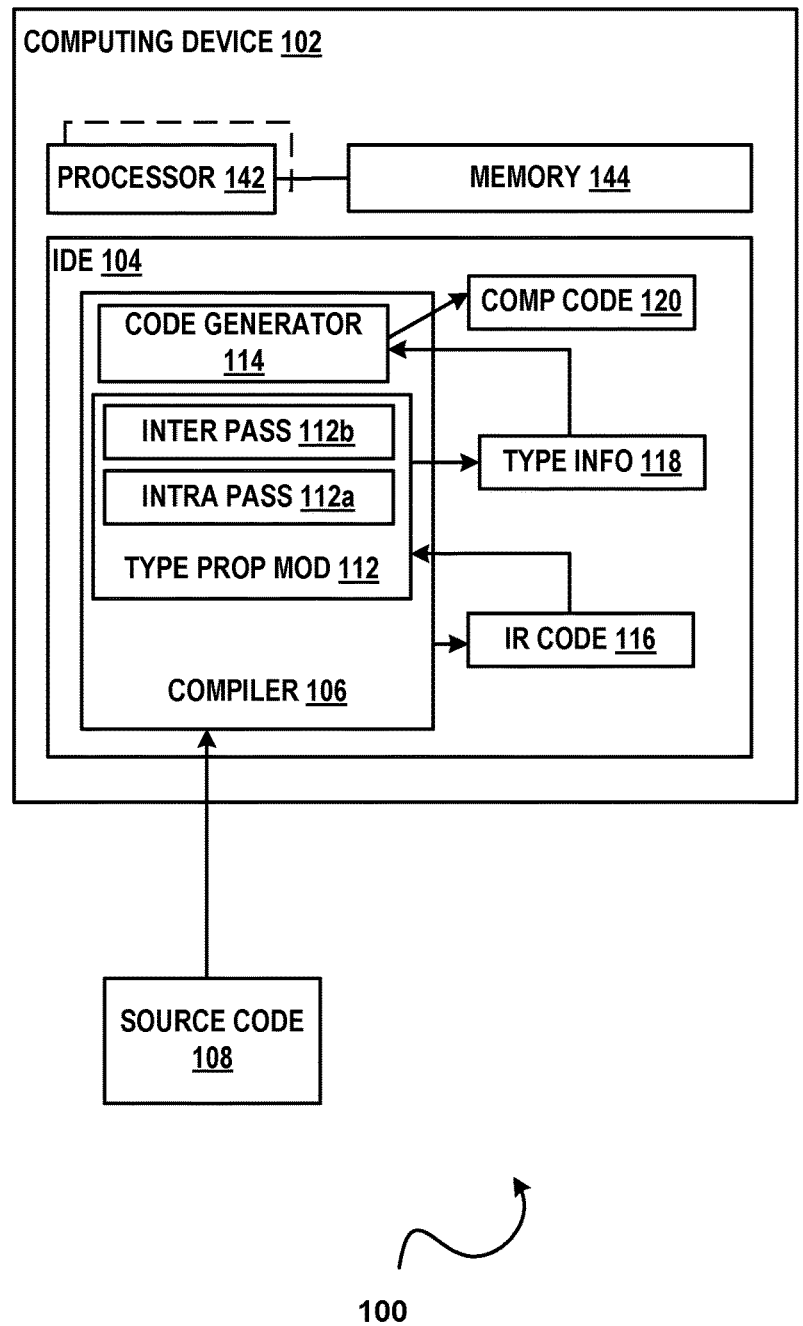
FIG. 1 illustrates an example of a system 100 comprising an optimizing compiler in accordance with aspects of the subject matter described herein.

Because of the need for abstraction, object-oriented languages support dynamic binding of functions based on runtime values. To be able to optimize a virtual function call by statically binding a function before runtime, the type of the object on which the function is invoked has to be determined. In accordance with aspects of the subject matter described herein, a type propagation technique is described in which type information determined anywhere in the source code through assignment statements, return values, new expressions inside functions and parameters, conditionals, loops, or any other source code construct can be propagated throughout the program. The technique described does not assume that the type of a variable does not change between initialization of the virtual function and the point at which the virtual function is invoked. Intra-procedural and inter-procedural dynamic type propagation can be used to optimize code by devirtualizing virtual functions. In the intra-procedural pass each function in the program can be inspected. If the dynamic type of a variable within the function is determined, the static type can be replaced by (initialized to) the dynamic type. If the dynamic type of a variable within the function is not determinable, a placeholder type can be inserted. After all the functions have been examined, an attempt is made to resolve all of the placeholder types created in the first pass, replacing the placeholder type with the dynamic type. This process can be iterated until additional dynamic type determination ends.

Inter-Procedural Type Propagation for Devirtualization

In some object-oriented programming languages, mechanisms such as inheritance enable the hiding of implementations of functions. For example, in C++ a virtual function is declared in a base class but an implementation for the virtual function is not necessarily provided. One or more classes derived from the base class can actually provide the implementation of the function inlining is typically not possible with virtual functions, because the callee of a virtual function is unknown at compile time. In fact, there may be many different callees based on different code execution flows to that point in the program. A virtual function is called "virtual" because a call to such a function using a pointer to the base class is typically redirected to the appropriate derived implementation depending on the true type of the object by a process called dynamic dispatch. For example, suppose a base class (Base) has a child class (Child) that inherits from Base. A virtual function call using pointer to Base may be redirected to the child implementation in Child by dynamic dispatch. Dynamic dispatch is inefficient because a table of function pointers for the base class has to be accessed to determine the derived class to which the pointer is redirected.

Being able to devirtualize a virtual function can involve determining when a pointer to a base class will always point to a particular child class or to a small set of potential child classes. If a pointer to a base class always points to a particular child class, dynamic dispatch is unnecessary: the child implementation can be called directly. This goal can be addressed by inspecting the types present in the program and determining, for example that a base class A declares a virtual function B that is always implemented by child class C. In this case, whenever a pointer to base class A is encountered, it can be replaced by a pointer to child class C, avoiding dynamic dispatch.

Similarly, if a new expression is directly passed as an argument to a function, calls inside that function can be devirtualized. For example, consider the program code:

```
class Base {
    virtual void func( ) = 0;
};
class Child : public Base {
    void func( ) { printf("Child"); }
};
void foo( ) {
    bar(new Child( ));
}
void bar(Base* b) {
    b->func( );
}
```

In the example source code reproduced above, the class Base is the base class ("class Base {"). Class Base has one virtual function called func ("virtual void func( )=0;"). The notation "func( )=0" means that the function "func" does not provide an implementation (i.e., func is a pure virtual function). The line "class Child: public Base {" means that class Child derives from the public class Base. Class Child is a subclass of class Base. Class Child implements the virtual function func. In this example, the class hierarchy is one virtual function func and one implementation of the virtual function that prints "Child" ("void func( ) { printf ("Child");}"). It will be appreciated that Base could have one or more derived classes of Base that could provide different implementations for func but in this example there is only one subclass of Base which is Child. Function foo creates a new Child object and passes it in to function bar as a parameter ("bar(new Child( ));"). Bar has one argument (parameter) b of type Base ("void bar(Base*b) {").

Ordinarily the statement "b->func( );" would trigger dynamic dispatch. However, because the call site for bar passes in a new Child object as a parameter and it is known that that the Base pointer always points to a Child because there is only one statement in the program where bar is called and that statement passed in a new Child pointer object. Thus the call to function func in the line "b->func ( );" can be devirtualized inside of function bar to directly call the function func defined in class Child because func is being called on a parameter (b), all the places that call function bar are known (there is only one) and in all (one) of them a Child is passed in. This is an example of propagating type from all the places that call bar (bar (new Child( )); to the function func. Thus if all the places in a program where a function is called are inspected and if all the parameters are a "new" expression then, assuming the type of the parameter does not change, the type of the parameter can be determined because when a new object is created its type is known.

Additional type information can be determined by inspecting each variable in a program and determining its type in a two pass process as described below. The additional type information discovered can be used to enable additional devirtualization to be performed. For each statement in the program (i.e., not just for statements that call a function) the set of types that every variable in the statement can be, can be determined. The type information determined for the variable can be iteratively propagated throughout the program. Propagation, as used herein, refers to the process of calculating the sets of types which are used to call a function or which are returned from a function, using placeholder types in the first pass for parameters and other return types whose types are unknown. In a second pass, the placeholder type can be replaced with concrete sets of types determined by analysis of other functions. Whenever a set of types for a variable only includes one type, the function referencing the variable can be devirtualized.

Consider the following code:

```
If(condition)
    A = 5;
Else
    A = 6;
```

In the code above, if (condition) is true A is set to 5, otherwise A is set to 6. Thus the set of possible values for A is the set containing the values 5 and 6.

The same type of analysis can be applied to types. Consider the following code:

```
If(condition)
    A = new Child( );
Else
    A = new Child2( );
```

If (condition) is true A will be of type Child. If (condition) is false, processing will fall through to the ELSE clause and A will be of type Child2. Thus the set of possible types for A is the set containing the type Child and the type Child2.

Now consider the following code:

```
If(condition) {
    A = new Child( );
}
Else {
    A = new Child2( );
    X = A;
}
```

In this code an assignment statement sets X to A which is of type Child2 so X is also of type Child2. This is an example of type propagation inside of a function (intra-procedural type propagation) in which types are propagated within a function. In accordance with aspects of the subject matter described herein, in the first intra-procedural pass each function is inspected in isolation and an attempt is made to determine the type of each variable at every location.

Consider the following code:
X=Foo( );
In this case the type of what function foo returns can not be determined by doing intra-procedural analysis. The code indicates that X is the return value that results when function foo is called. The type of X cannot be determined until function foo is examined during the inter-procedural analysis pass. Placeholder types can be created for unknown entities such as for the return values of functions. Thus, X can be assigned a placeholder type which stands in for the return type of foo.

Now consider the following code in which similar processing is applied to parameters of a function.

```
void Bar(Base* b) {
    If(condition) {
        A = b;
    }
    Else {
        A = new Child2( );
        X = Foo( );
    }
}
```

In this code the function Bar is defined ("void Bar(Base*b) {"). Bar has a parameter called b which is a pointer of type Base. The true dynamic type of b is unknown. It is known that b is some derived subclass of Base. The third line of code sets the variable A to parameter b. The variable A can be assigned a placeholder type indicating that the true dynamic type of A is whatever the type of the parameter b is eventually determined to be. If subsequently A is set to something else, similar processing will be performed so that the set of possible types for A will eventually be the set of whatever the type of parameter b turns out to be and Child2.

Now suppose a statement that calls a function is encountered. Suppose there is a call to the function bar that was defined in the first line of code above followed by some assignment statements:

```
Bar(new Child2( ));
X = new Child2( );
Y = X;
Bar(Y)
```

A Child2 object is created and is passed to Bar. Next two assignment statements are encountered in which X is set to Child2 and Y is set to X. In accordance with aspects of the subject matter described herein, after the first intra-procedural analysis pass is performed and placeholder types have been assigned to anything whose type is not known, the second inter-procedural analysis pass is performed in which attempts to resolve all the placeholder types to the real types are made. The placeholder type for X is replaced with the concrete dynamic type Child2. All of the places in the program that call function Bar are examined. All of the sets of types passed in for the parameter (b) are collected. All the instances of the first parameter placeholder are overwritten with the set of concrete types. In the example above, the concrete type is Child2. Through the assignment statement X=new Child2( ); it can be determined that only Child2 is passed in. Thus all dynamic types for A can be replaced by the static type Child2.

Similar analysis is performed for return statements. At every location in the program at which a return statement is encountered all of the types having the return information can be collected into a set of possible types for the return information. Each function to which the return information is returned can be inspected. The set of types can be used to refine the set of known types on the return values. The refining process is iterative and continues until no more new information is found and types cannot be refined further. That is, after the first intra-procedural pass is performed, each place in the program that references a particular function or variable is examined. Wherever concrete type information is found, the information can be used to refine the placeholder types and to update the set of possible types wherever the function or variable is encountered. The process of updating placeholder types can impact other functions and variables. For example, when more concrete type information is found in a function, all of its callers and callees can be re-evaluated. If more concrete information is found during the re-evaluation, the process continues with its callers and callees. In accordance with some aspects of the subject matter described herein, a list or queue can be maintained of functions to examine Initially every function is placed in the queue. Functions can be added to the end of the queue when new information is found. When the queue is empty, the second pass is complete.

For example, in the following code:

```
If(condition) {
    A = new Child( );
}
Else {
    A = new Child2( );
    X = Foo( );
}
```

X is set to the return value of Foo. Perhaps Foo only returns one type (type T) ever. X, to which a placeholder for a return of Foo was originally set, can now be assigned the type T. Furthermore if X was passed as a parameter to another function F then the placeholder for Function F can be replaced with the true dynamic type T. If X was returned to a caller or callers, the placeholder for X in the calling function(s) can be updated with the true dynamic type T. The return type of Foo (with the associated placeholder type) can then be used as a parameter to another function.

FIG. 1 illustrates an example of a system 100 comprising an execution environment for an optimizing compiler in accordance with aspects of the subject matter described herein. All or portions of system 100 may reside on one or more computers or computing devices such as the computers described below with respect to FIG. 3. System 100 may execute in whole or in part on a software development computer such as the software development computer described with respect to FIG. 4. System 100 or portions thereof may execute within an integrated development environment or IDE such as IDE 104 or may execute outside of an IDE. The IDE can be an IDE such as the one described with respect to FIG. 4 or can be any other IDE. System 100 or portions thereof may be provided as a stand-alone system or as a plug-in or add-in.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, and so on. A computing device such as computing device 102 can include one or more processors such as processor 142, etc., and a memory such as memory 144 that communicates with the one or more processors.

System 100 can include any combination of one or more of: a compiler such as compiler 106. The compiler can be a background compiler, a parallel compiler or an incremental compiler, a plug-in, an add-in or extension to an IDE, parser, compiler or pre-processor. The compiler can compile source code such as source code 108 written in any programming language into native code, intermediate code, IR code, managed code or bytecode.

Compiler 106 can include one or more program modules that perform type propagation such as type propagation module 112. Compiler 106 can include one or more program modules that convert source code such as source code 108 for a program into an intermediate graph data structure (e.g., intermediate representation (IR) code such as IR code 116). Creation of IR code can facilitate flow analysis and other types of pre-processing before computer executable instructions are generated. One or more type propagation modules such as intra-procedural pass module 112a can perform a first intra-procedural analysis pass on the IR code 116. One or more type propagation modules such as inter-procedural pass module 112b can perform a second inter-procedural analysis pass. In the first intra-procedural pass, each function inside the program can be examined. An attempt can be made to determine the type of program elements of the function.

If the type cannot be determined, the element can be assigned a place holder type. For example, place holder types can be assigned to parameters of functions called by the function being examined. Parameters of functions called by the function being examined may not be determinable without examination of the called function. Similarly, place holder types can be assigned to the return values of callee functions. In the second inter-procedural pass, for every function that is called by the examined function, the type of the parameters passed into the called function can be determined. When type information is determined the type information can be propagated to the callers or callees of the function.

Similarly, for every return value sent to a calling function the type of the return value sent to the calling function can be determined. Similarly, whenever an assignment statement is made within a function or within a program construct such as an IF ELSE or WHILE construct, etc. the type of the assigned variable can be determined and propagated to any function using the variable. The process can be iterated until no more new type information can be found. The type information can be collected in a data structure represented in FIG. 1 by type information 118. Type information 118 may reside in a call graph representing a calling hierarchy of functions. The IR code 116 and the type information 118 can be received by a code generator such as code generator 114 that produces compiled code such as compiled code 120. Compiled code 120 may be code that has been devirtualized by a devirtualization module (not shown). One or more devirtualization modules can be included within the code generator or can be external to the code generator. The compiled code 120 that is produced can be optimized code.

Figure 2A:
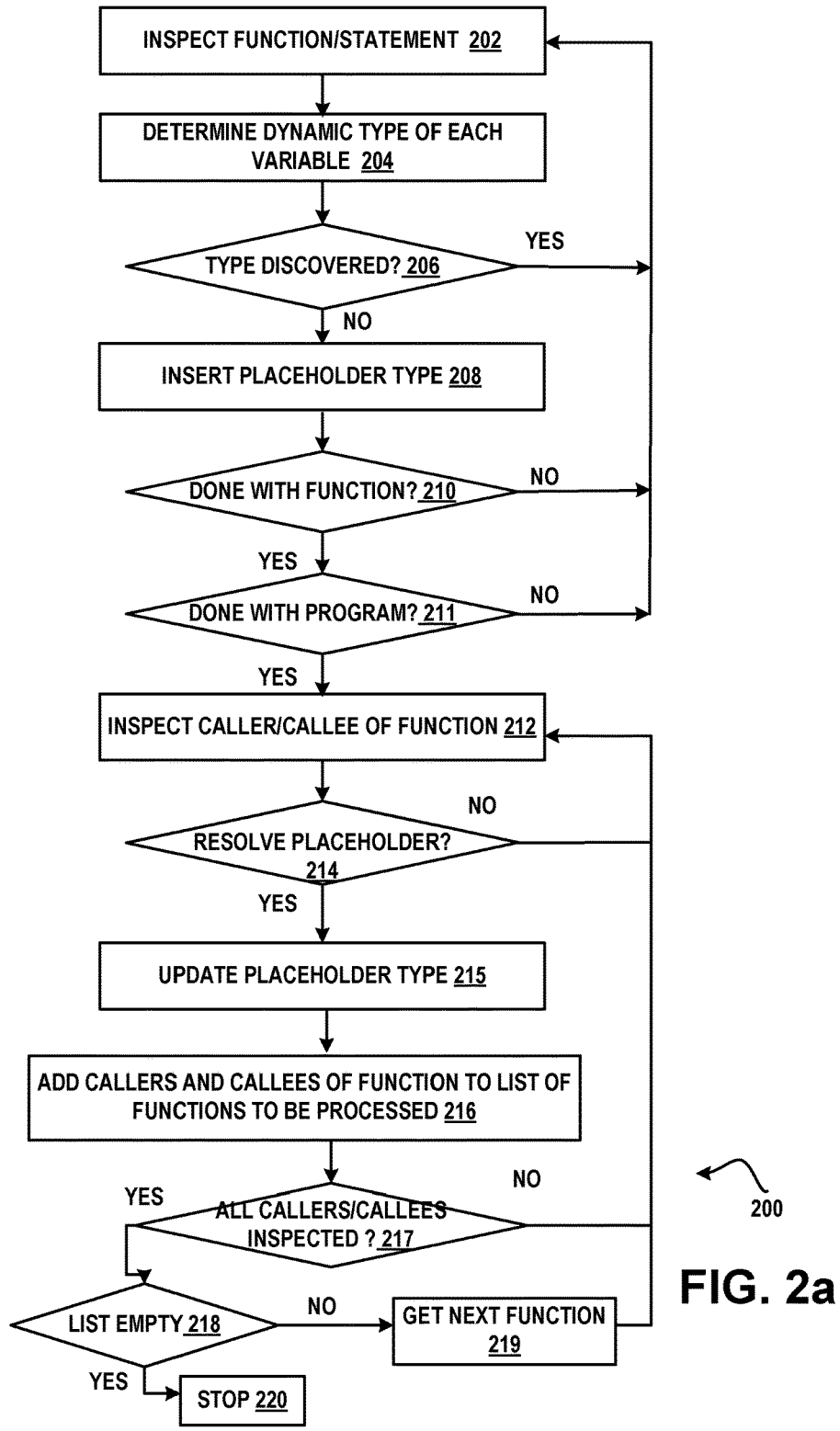
FIG. 2a illustrates an example of a method 200 for performing type propagation in accordance with aspects of the subject matter disclosed herein.

FIG. 2a illustrates an example of a method 200 for performing type propagation in accordance with aspects of the subject matter described herein. The method described in FIG. 2a can be practiced by a system such as but not limited to the one described with respect to FIG. 1. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed.

As described more fully above, at operation 202 source code can be received and IR code can be generated therefrom. Operations 202 through 211 represent a first intra-procedural pass of class type determination in which an attempt to determine the dynamic class type of each variable can be made. The first function in the IR code can be inspected at operation 202. At operation 204 an attempt can be made to determine the dynamic type of each variable in the statement being processed. At operation 206, if the type of the variable is discovered the type can be persisted and the next statement of the function can be inspected at operation 202. At operation 206 if the dynamic type of the variable cannot be determined by inspection of the function being processed, at operation 208 a placeholder type can be inserted for the unknown type. At operation 210, if all the code of the function has been examined, processing can continue at operation 211. At operation 210, if all the code of the function has not been examined, processing can return to operation 202 in which the next statement is inspected. If at operation 211, it is determined that all of the statements in the program have not been inspected, processing can continue at operation 202 in which the next statement or function is inspected.

If at operation 211, it is determined that all of the statements in the program have been inspected, a second pass comprising an inter-procedural pass of type propagation can be initiated. The inter-procedural pass can include operations 212 through 220. The inter-procedural pass can process the same function multiple times. At operation 212, a function in the program can be examined. All of the callers of the function being processed and all of the callees of the function being processed can be inspected. The code for the caller and callee functions can be inspected to resolve the type of placeholder types of the function being processed at operation 214. If a placeholder type has not been resolved, processing can return to operation 212 and the next caller or callee of the function being processed can be inspected. If a placeholder type has been resolved, the placeholder type for the function being processed can be replaced by the precise type of the caller parameter or callee return type at operation 215 and the callers and callees of the caller or callee function can be added to a list of functions to be reprocessed at operation 216.

For example, if a function A invokes a function B and function B passes function A a return type of type T, the placeholder type for function A's return type parameter in function B can be replaced by parameter T at operation 215 and so on. Whenever a parameter is resolved, the functions affected by the resolution (callers and callees of the function for whom a placeholder type was resolved) can be added to a list of functions to be re-processed at operation 216. At operation 217 if all the callers and callees for the function being processed have been inspected the next function in the list can be processed by returning to operation 212 and inspecting all the callers and all the callees of the next function in the list and so on. If at operation 217 it is determined that there are more caller and/or callee functions, processing can return to operation 212 and the next caller or callee of the function being processed can be inspected. At operation 218 if it is determined that there are no more functions in the list of functions to be processed, the inter-procedural function can be terminated at operation 220. At operation 218 if the list is not empty, the next function from the list can be accessed at operation 219 and processing can continue at operation 212.

Suppose for example, a function bar is being processed. All the callers and callees of function bar can be examined. Suppose for example, a callee of function bar is being inspected. Suppose function bar calls function foo. Function foo is a callee of bar. When function foo is inspected, the code that determines what types of parameters foo is passing in to its caller (bar) can be examined and a set of all the types that are passed in for each parameter can be determined. If the set includes placeholder types nothing more can be done. If, on the other hand, the set of all the types that are passed in for each parameter is a set of precise types instead of placeholder types, bar's placeholder type can be replaced with the precise type or types. The callers and callees of function bar can be added to the list to be reprocessed. Now suppose a caller of function bar is being inspected. Suppose function baz calls function bar. Function baz is a caller of function bar. When function baz is inspected, baz will have the set of all types that it returns. If the set of all types that baz returns are precise types, the return type placeholder for bar can be replaced with the set of precise types that baz returns. The callers and callees of function bar can be added to the list to be reprocessed. When no more precise type information is being determined, no more functions will be added to the list of functions to be reprocessed and the inter-procedural pass will eventually terminate.

Figure 2B:
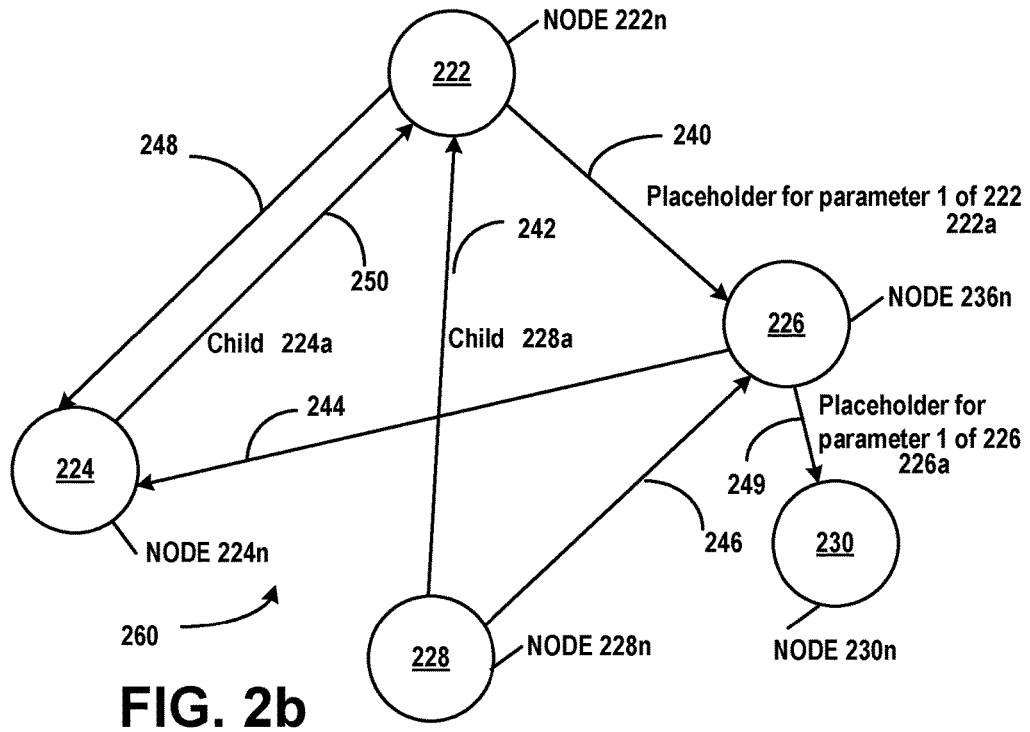
FIG. 2b illustrates an example of data structures that can be used by system 100 when performing the first pass portion of method 200 in accordance with aspects of the subject matter described herein.

FIG. 2b illustrates an example of a data structure 260 that can be used when performing method 200. Data structure 260 can represent a call graph that comprises a plurality of nodes representing functions. Although five nodes are presented in the data structure 260 of FIG. 2b, it will be appreciated by those of skill in the art that such a contemplated data structure is not limited to any particular number of nodes. In data structure 260, node 222n represents a first function, function 1 222, node 224n represents a second function, function 2 224, node 226n represents a third function, function 3 226, node 228n represents a fourth function, function 4 228 and node 230n represents a fifth function, function 5 230. The edges represent the relationship between functions. For example, edge 240 indicates that function 1 222 calls function 3 226 or identically, that function 3 226 is called by function 1 222. Edge 242 indicates that function 4 228 calls function 1 222. Edge 244 indicates that function 3 226 calls function 2 224. Edge 246 indicates that function 4 228 calls function 3 226. Edge 248 indicates that function 1 222 calls function 2 224. Edge 250 indicates that function 2 224 calls function 1 222. Edge 249 indicates that function 3 226 calls function 5 230. During the first pass each function is inspected and a complete list of types that the function can pass to a caller is determined. Some of the types can be placeholder types. The list of types can be added to the corresponding edges of the data structure.

Figure 2C:
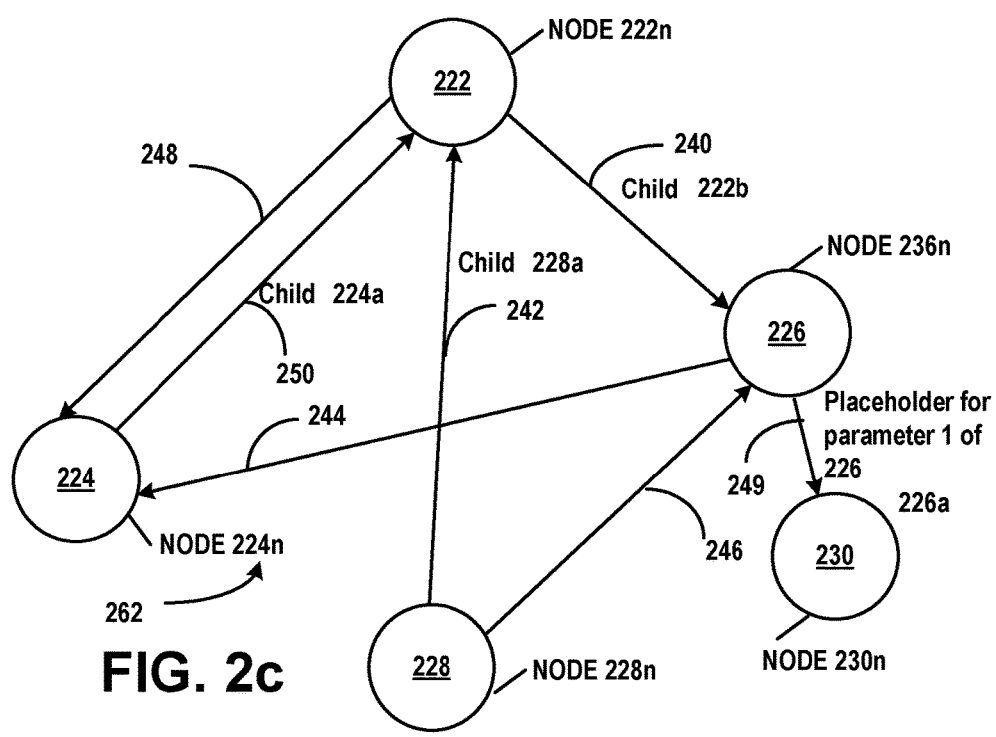
FIG. 2c illustrates an example of data structures that can be used by system 100 when performing an iteration of the second pass portion of method 200 in accordance with aspects of the subject matter described herein.
Figure 2D:
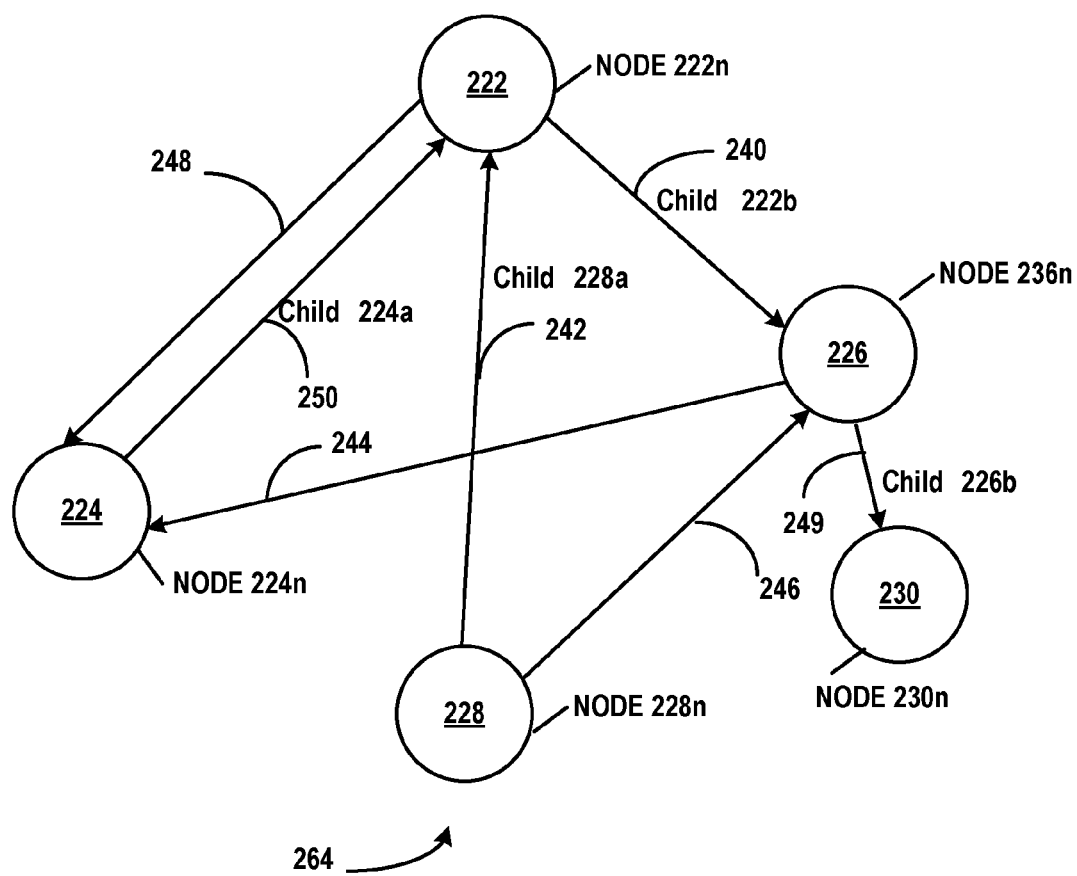
FIG. 2d illustrates an example of data structures that can be used by system 100 when performing an iteration of the second pass portion of method 200 in accordance with aspects of the subject matter described herein.

For example, in FIG. 2b function 1 222 has one parameter but the type of the parameter is unknown. Therefore the parameter of function 1 222 is assigned a placeholder type (placeholder for parameter 1 of 222, 222a). Function 1 222 is called by function 2 224 and by function 4 228. If both function 2 224 and function 4 228 pass in a parameter of type Child (e.g., the precise type of the parameter passed from function 4 228 is Child 228a and the precise type of the parameter passed from function 2 224 is Child 224a) then if function 1 222 passes that parameter to function 3 226, the placeholder type for the parameter of function 1 222 that is passed into function 3 226 can be replaced with a precise type Child 222b as shown in FIG. 2c data structure 262. Now suppose that function 3 226 calls another function, function 5 230 with function 1's first parameter. Because it is now known that the parameter that function 1 222 passed into function 3 226 is of type Child, it can be determined that if that parameter is passed into function 5 230, the type of the parameter passed into function 5 230, indicated in data structure 260 and in data structure 262 as placeholder for parameter 1 of 226, 226a can be replaced by precise type Child as illustrated in FIG. 2d, data structure 264 Child 226b.

Described is a system comprising at least one processor, a memory connected to the at least one processor and at least one program module loaded into the memory, the at least one program module determining type information for all statements in a program by examining each function of a plurality of functions in the program in a first intra-procedural pass, where an unknown class type is indicated by inserting a placeholder class type as a class type of a variable; and resolving the inserted placeholder class type in a second inter-procedural pass by propagating a discovered class type for the variable from function to function within the program. The disclosed system can be a system in which a class type of the variable is set to a class type of a parameter passed to a caller of the function being examined. The disclosed system can be a system in which a class type of the variable is set to a return type of a callee of the function being examined. The disclosed system can be a system in which the variable is assigned a new value. The disclosed system can be a system in which the variable is assigned a new type within the function. The disclosed system can be a system in which the variable is assigned a new type outside the function. The disclosed system can be a system in which resolved class types are iteratively propagated to other functions.

Described is a method in which a processor of a computing device performs a first intra-procedural pass examining a function in program code and inserting a placeholder type for a variable in the function whose dynamic type cannot be determined; and in a second inter-procedural pass determines the dynamic type for the placeholder type by inspecting inter-procedural relationships between functions in the program code. The method can be a method in which the function is a first function and the first function calls a second function, wherein the dynamic type of the variable is defined in the second function. The method can be a method in which the function is a first function and the first function is called by a second function, wherein the dynamic type of the variable is defined in the first function. The method can be a method in which the function comprises a conditional expression in which in response to a first condition the dynamic type of the variable is a first dynamic type and in response to a second condition the dynamic type of the variable is a second dynamic type. The method can be a method in which the placeholder type is replaced with a dynamic type. The method can be a method in which the variable is assigned a new value within the function, the new value having a different class type. within the function.

Disclosed is a computer-readable storage medium comprising computer-readable instructions which when executed cause at least one processor of a computing device to perform a first intra-procedural pass examining a function in program code and inserting a placeholder type for a variable in the function whose dynamic type cannot be determined and in a second inter-procedural pass determining the dynamic type for the placeholder type by inspecting inter-procedural relationships between functions in the program code. The computer-readable storage medium may include further computer-readable instructions which when executed cause the at least one processor to examine the function, wherein the function is a first function and the first function calls a second function, wherein the dynamic type of the variable is defined in the second function. The computer-readable storage medium may include further computer-readable instructions which when executed cause the at least one processor to examine the function, wherein the function is a first function and the first function is called by a second function, wherein the dynamic type of the variable is defined in the first function. The computer-readable storage medium may include further computer-readable instructions which when executed cause the at least one processor to examine the function wherein the function comprises a conditional expression in which in response to a first condition the dynamic type of the variable is a first dynamic type and in response to a second condition the dynamic type of the variable is a second dynamic type. The computer-readable storage medium may include further computer-readable instructions which when executed cause the at least one processor to replace the placeholder type with a dynamic type. The computer-readable storage medium may include further computer-readable instructions which when executed cause the at least one processor to assign a new value to the variable within the function. The computer-readable storage medium may include further computer-readable instructions which when executed cause the at least one processor to convert a dynamically bound function call into a statically bound direct call.

Example of a Suitable Computing Environment

Figure 3:
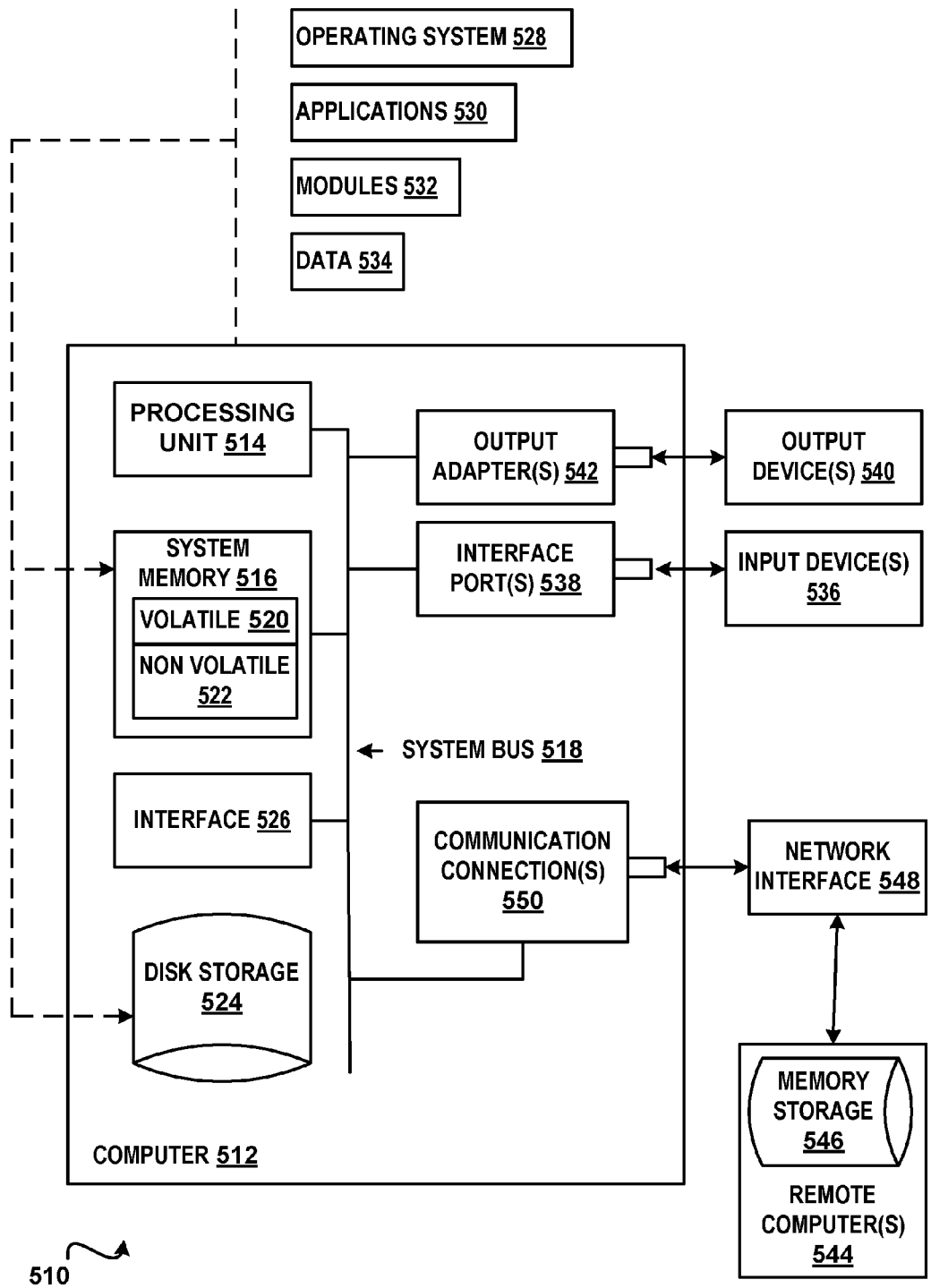
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Figure 4:
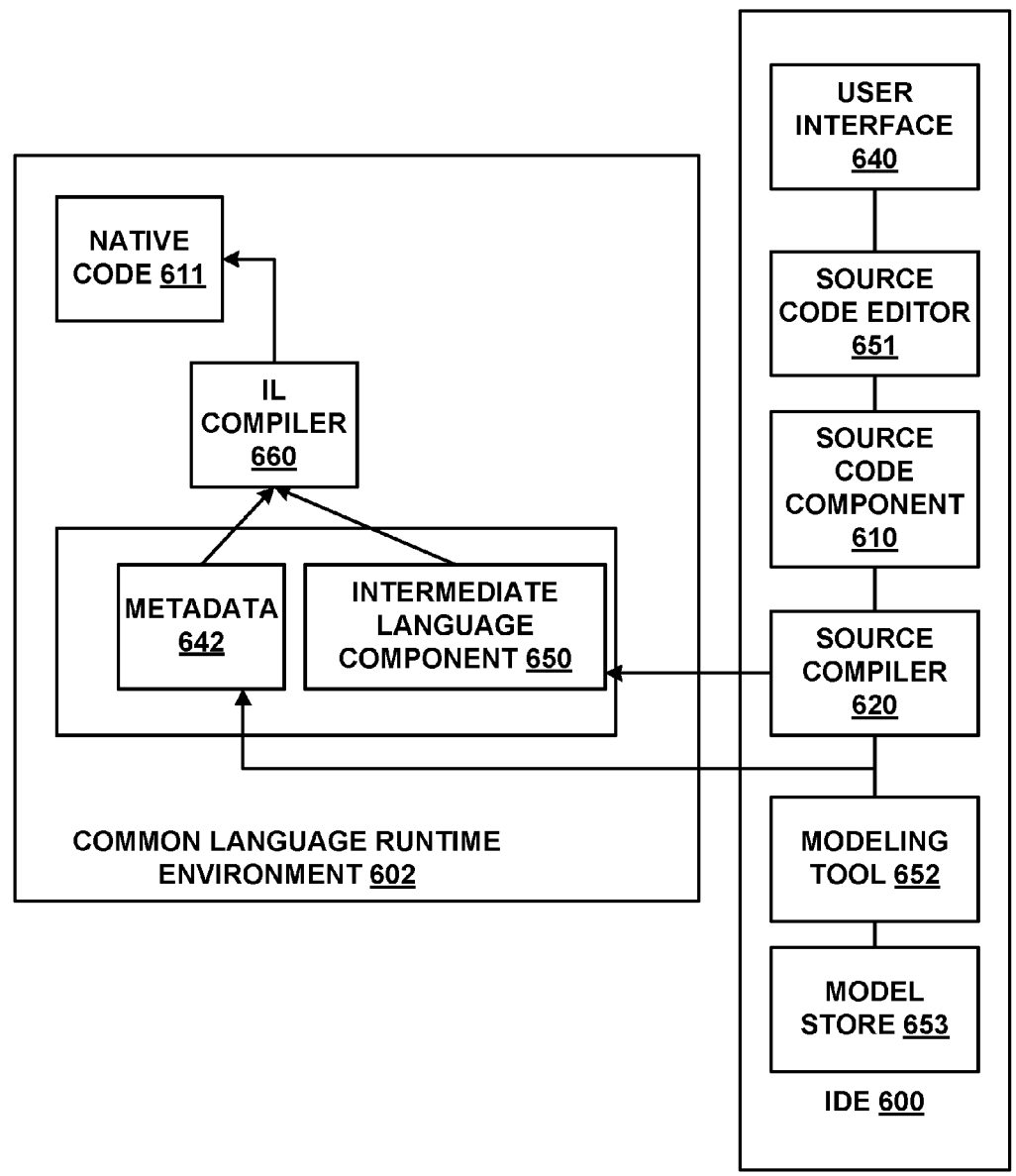
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++, C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
at least one processor;
a memory connected to the at least one processor;
wherein the at least one processor is configured to perform actions comprising:
examining one or more functions of a plurality of functions in a program in a first intra-procedural pass through a program to determine a class type for at least one variable in the function being examined;
inserting, in the first intra-procedural pass, a placeholder class type as a class type for a variable in the function being examined that has an unknown class type; and
replacing the inserted placeholder class type in a second inter-procedural pass by propagating a discovered class type for the variable having the unknown class type from an inter-procedural type analysis, the discovered class type being a return type of a virtual function call that is discovered from the inter-procedural type analysis, the virtual function call within the function being examined.

2. The system of claim 1, wherein the variable having the unknown class type is associated with an assignment statement that receives a return value from the virtual function call.

3. The system of claim 1, wherein the variable having the unknown class type is assigned a Previously Presented value.

4. The system of claim 1, wherein the variable having the unknown class type is associated with a return value from a callee function.

5. The system of claim 1, wherein the at least one processor is configured to perform further actions comprising:
iteratively propagating resolved class types to other functions.

6. The system of claim 1, wherein the unknown class type is not associated with a class type from within the program.

7. A method comprising:
performing, prior to runtime, by a processor of a computing device a first intra-procedural pass examining a function in program code to determine a class type for at least one variable whose dynamic type cannot be determined, the at least one variable assigned to a return value of a virtual function within the examined function;
inserting a placeholder type for the class type of the at least one variable;
executing a second inter-procedural pass to inspect each caller of the virtual function and each callee of the virtual function; and
determining the dynamic type for the placeholder type based on the second inter-procedural pass; and
replacing the placeholder type with the dynamic type, wherein the dynamic type includes a type of the return value.

8. The method of claim 7, wherein the function is a first function and the first function calls a second function, wherein the dynamic type of the variable is defined in the second function.

9. The method of claim 7, further comprising:
wherein the variable is assigned a new value within the function, the new value having a different class type within the function.

10. The method of claim 7, further comprising:
iteratively propagating resolved class types to other variables whose dynamic class types are unknown.

11. A device, comprising:
at least one processor and a memory;
wherein the at least one processor is configured to execute instructions that perform actions to:
perform a first intra-procedural pass during compilation of a program to examine a function in program code to determine a class type for at least one variable of the function;
detecting an unknown dynamic class type for a first variable of the function during the first intra-procedural pass;
inserting a placeholder class type for the unknown dynamic class type of the first variable;
in a second inter-procedural pass during compilation of the program, determining the dynamic type for the placeholder type by inspecting inter-procedural relationships between functions in the program code; and
replacing the dynamic type for the placeholder type, the dynamic type including a return type of a virtual function call, within the function being examined, that is discovered from the inter-procedural type analysis.

12. The device of claim 11, wherein the at least one processor is further configured to execute instructions that perform actions to:
examine the function, wherein the function is a first function and the first function includes a call to a second function, wherein the dynamic type of the first variable is defined in the second function.

13. The device of claim 11, wherein the at least one processor is further configured to execute instructions that perform actions to:
examine the function, wherein the function is a first function and the first function is called by a second function, wherein the dynamic type of the variable is defined in the first function.

14. The device of claim 11, wherein the at least one processor is further configured to execute instructions that perform actions to:
iteratively propagate resolved class types to other variables whose dynamic class types are unknown.

* * * * *